(12) United States Patent
Kizawa

(10) Patent No.: US 6,611,355 B1
(45) Date of Patent: Aug. 26, 2003

(54) COLOR FACSIMILE MACHINE

(75) Inventor: Makoto Kizawa, Ueda (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 0 days.

(21) Appl. No.: 09/142,041

(22) PCT Filed: Jul. 17, 1997

(86) PCT No.: PCT/JP97/02477

§ 371 (c)(1),
(2), (4) Date: Sep. 1, 1998

(87) PCT Pub. No.: WO98/31140

PCT Pub. Date: Jul. 16, 1998

(30) Foreign Application Priority Data

Jan. 14, 1997 (JP) .............................. 9-017485

(51) Int. Cl.⁷ ............................................... H04N 1/46
(52) U.S. Cl. ..................... 358/1.9; 358/500; 358/434; 358/450
(58) Field of Search ....................... 358/1.9, 500, 539, 358/400, 402, 434, 435, 436, 438, 439, 448, 450, 468

(56) References Cited

U.S. PATENT DOCUMENTS

| 5,032,904 | A | * | 7/1991 | Murai et al. ................. | 358/500 |
| 5,349,450 | A | | 9/1994 | Yoshioka et al. | |
| 5,357,347 | A | | 10/1994 | Hirose et al. | |
| 5,387,984 | A | * | 2/1995 | Nakatani et al. ............ | 358/439 |
| 5,724,157 | A | * | 3/1998 | Otani et al. .................. | 358/450 |
| 5,726,777 | A | * | 3/1998 | Yoshida et al. .............. | 358/500 |
| 5,761,394 | A | * | 6/1998 | Sugiura et al. ............... | 358/1.9 |
| 5,801,846 | A | * | 9/1998 | Nobuta ........................ | 358/468 |
| 5,896,207 | A | * | 4/1999 | Tomida ........................ | 358/537 |
| 6,278,529 | B1 | * | 8/2001 | Akimoto ...................... | 358/1.9 |
| 6,359,707 | B1 | * | 3/2002 | Tadokoro et al. ............ | 358/500 |

FOREIGN PATENT DOCUMENTS

| EP | 0450852 | 10/1991 |
| JP | 59194570 | 11/1984 |
| JP | 63-33067 | 2/1988 |
| JP | 2-284579 | 11/1990 |
| JP | 3-91370 | 4/1991 |
| JP | 3-277068 | 12/1991 |
| JP | 5-63999 | 3/1993 |
| JP | 6-38053 | 2/1994 |
| JP | 6-125473 | 5/1994 |
| JP | 7-203226 | 8/1995 |
| JP | 8-175238 | 7/1996 |

OTHER PUBLICATIONS

English Language Abstract of JP No. 8–175238.
English Language Abstract of JP No. 63–33067.
English Language Abstract of JP No. 6–38053.
English Language Abstract of JP No. 6–125473.
English Language Abstract of JP No. 2–284579.
English Language Abstract of JP No. 5–63999.
English Language Abstract of JP No. 7–203226.
English Language Abstract of JP No. 3–277068.
English Language Abstract of JP No. 59–194570.
English Language Abstract of JP No. 3–91370.

* cited by examiner

Primary Examiner—Thomas D. Lee
(74) Attorney, Agent, or Firm—Greenblum & Bernstein, P.L.C.

(57) ABSTRACT

The color facsimile apparatus comprises communication result report generating means for synthesizing a part of unsent image data with communication result data of the communication so as to be output. When the image data is color image data, the part of image data is converted to monochromatic image data so as to generate image data to be synthesized with the transmission result report. When an absence of any one of printing material occurs, color image data is converted to image data of a single color to be printed, and data, showing that received data has been color image data, is displayed on a printing paper.

23 Claims, 9 Drawing Sheets

TECHNICAL FIELD

The present invention relates to a color facsimile apparatus for transmitting image data obtained by color reading a color original paper after being color encoding and for color printing received data.

BACKGROUND OF ART

The provisions of color facsimile apparatus are present under ITU-T Recommendation 81. The color facsimile apparatus is proceeding toward practical utilization in accordance with the provisions.

In color image data, which the color facsimile apparatus processes, a size of a data item is generally large. This causes problems, e.g., a memory for storing data is liable to overflow, a large amount of time is required to perform data receiving and transmitting and printing and outputting, a large quantity of color printing material (ink) consumed is needed, etc.

The following will specifically explain the troubles caused by the above problems.

First, there is an ink jet printing method as a method for printing received data in the color facsimile apparatus. This method is used in an ink jet printer, and ink of the respective colors of C (Cyan), M (Magenta), Y (Yellow) and K (Black) in an ink tank is discharged onto a printing paper to perform the printing. Normally, ink of the respective colors of C (Cyan), M (Magenta), Y (Yellow) is uniformly prepared.

However, receiving and transmitting color data is not uniformly prepared in its color. As a result, in many cases, any one of color ink is first used up in the facsimile apparatus. Since the color original paper has a large amount of data, ink is easily used up, and the normal color printing cannot be performed when the absence of ink occurs.

Unlike the ink jet printer, in the facsimile apparatus, an operator on a transmitting side cannot know the remaining quantity of ink. Due to this, in some cases, ink is used up during the receiving and transmitting, or ink is already used up before the start of receiving and transmitting. In this case, even if the absence of ink occurs in the receiver, a sender often takes it for granted that the transmission is normally received only if the transmission normally ended. This causes troubles relating to the completion of transmission and that of reception.

The following methods are present in order to take measurements against the case in which the absence of ink occurs in the facsimile apparatus.

First, there is prior art disclosed in, for example, un-examined Japanese Patent Publication NO.7-46417. According to this prior art, if any one of color ink is absent, the printing is performed using another color ink.

However, it is originally unfavorable that the printing is performed using another color ink. In the case of the facsimile apparatus, even if the receiver receives a printing paper of a color different from the transmitted original paper, there is a possibility that the receiver will not notice the reception. In view of this point, there is prepared an economy mode in which the consumption of color ink is low in the ink jet printer. The economy mode is that the amount of discharging ink as a whole is reduced as the operator confirms the content of the original paper, with the result that time elapsing before the absence of ink can be prolonged.

However, the facsimile apparatus cannot print and output received data while the operator on the receiving side is conforming received data before the printing and outputting data. As a result, it is difficult to change the mode to the economy mode in accordance with the content of the received content.

Next, there is a method using a receiving memory. More specifically, according to this method, when the absence of ink occurs, the printing and outputting of the received data is prohibited and all received data is stored in the receiving memory. Then, stored data is output after replenishing the ink tank with ink.

However, since there is a limitation in the memory capacity, the memory for storing received data overflows, so that received data may be lost. Particularly, when received data is color data whose size is large, the overflow is liable to occur.

In order to deal with this problem, there is prior art disclosed in, for example, Japanese un-examined Japanese Patent Publication NO.8-79543. According to this prior art, when the remaining quantity of the memory capacity for storing received data is below a fixed value, color data already stored is converted to monochromatic data to be printed and output and the color data stored in the memory is erased. Thereby, a memory space area is reserved. However, according to this method, though the overflow of the memory can be avoided, there is a disadvantage in which whether the received data is color data or monochromatic data cannot be determined.

Secondly, the color facsimile apparatus have come into wide use gradually. However, most of the facsimile apparatus, which are put on the market, are ones that receive and transmit the monochromatic images. An operator of the color facsimile apparatus must perform the communication on the assumption of the following two cases. Specifically, one is that the receiver is the facsimile apparatus having a function of receiving color images and the other is that the receiver is the facsimile apparatus having a function of receiving only the monochromatic image. Consequently, the operation becomes complicated. In other words, whether the receiver corresponds to the former case or the latter case is clarified by exchanging a capability notice in the communication procedure after a call is established. For this reason, the operator cannot know the function of the receiver at time of reading and storing original paper, which is before the start of the communication procedure. Therefore, in order to avoid the occurrence of a non-communicating state, the operator must select whether color data is color coded and stored or monochromatically coded and stored in advance, depending on the counterpart.

Thirdly, there is a case in which color data and monochromatic data are mixed in one communication. If color data and monochromatic data are separately transmitted, the transmission operation becomes further complicated, and the entire transmission process amounts to a considerable long period of time. In order to deal with this problem, there is prior art disclosed in, for example, un-examined Japanese Patent Publication NO.7-283951. According to this prior art, whether the original paper is color or monochromatic is determined after reading the original paper for transmission. Then, an encoding process is executed in accordance with the result of the determination. According to this technique, the operator's load can be somewhat reduced. However, since the determination process is performed after scanning the original paper, and the encoding process is further executed, a large amount of time is required when the transmission process is executed.

DISCLOSURE OF THE INVENTION

The present invention is provided to solve the above-mentioned conventional problems of the color facsimile apparatus and to improve the operability of the color facsimile apparatus as a whole.

More specifically, an object of the present invention is to provide a color facsimile apparatus, which reduces an amount of ink consumption to prevent an absence of ink.

Another object of the present invention is to provide a color facsimile apparatus being capable of obtaining excellent received data even if an absence of ink occurs. More specifically, even if the absence of ink occurs and data is printed and output with ink of a different color, whether transmitting original data is color or monochromatic can be determined.

Further another object of the present invention is to provide a color facsimile apparatus being capable of transmitting data to either one of the color facsimile apparatus and the monochromatic facsimile apparatus by a simple operation and for a short period of time.

The above object can be attained by the color facsimile apparatus comprising communication result report generating means for synthesizing a part of unsent image data with communication result data of the communication so as to be output, and data converting means for converting the part of the color image data to monochromatic image data so as to generate image data to be synthesized with the transmission result report when the unsent image data is color image data.

In this case, it is preferable that the data converting means extract only G component data as a part of RGB component data of color image data so as to be converted to monochromatic data.

According to the above-mentioned structure, when the transmission of color image data is not normally ended, the communication report is converted to monochromatic data to be output, so that the amount of color printing material consumed can be reduced. This results in a large effect on particularly the reduction of the quantity of the ink consumption in the apparatus using color ink for printing. Moreover, since the output is performed with monochromatic data, data can be printed and output for a short period time as compared with the case of outputting color data. Therefore, time when the communication result report output process occupies a printing section can be reduced to the maximum, and this operation improves an efficiency of using the apparatus.

Also, the above-mentioned object can be attained by the color facsimile apparatus comprising a memory for storing received color image data sequentially, printing means for reading color image data from the memory and printing the color image data with printing material of a plurality of colors, and controlling means for converting the color image data to image data of a single color to be printed by the printing means when any one of the printing material is used up and for displaying data, showing that the received image data has been color image data, on a printing paper.

In this case, when the remaining quantity of the memory capacity is below a fixed value, the color image data may be converted to image data of a single color to be printed. Also, data, showing that the received image data has been color image data, may be displayed on a printing paper other than a page on which image data is printed.

Moreover, controlling means can avoid the overflow of the memory by erasing the color image data stored in the memory after the color image data is converted to the image data of a single color and printed by printing means.

By receiving an operator's instruction before the remaining quantity of the memory capacity is below the fixed value, the color image data stored in the memory may be converted to the image data of the single color to be printed by printing means. In this case, it is unnecessary to display data, showing that the received image data has been color image data. The operator, who instructs the data printing and outputting, knows that the image stored in the memory is the color image.

According to the above-mentioned structure, even if the absence of the printing material occurs, the printing and outputting can be performed without losing the received data. Also, the outline data of original image data can be obtained with a simple structure. Moreover, by adding a comment showing conversion data to monochromatic data, the receiver can understand that the original has been color data.

Further, the above-mentioned object can be attained by the color facsimile apparatus comprising a memory for storing mixed image data having both color image data and monochromatic image data; determination means for determining the presence of a color printing capability of a transmission counterpart in the course of the communication procedure; read controlling means for reading all mixed image data from the memory when the determination means determines that the transmission counterpart has the color printing capability and for reading only the monochromatic image data when the determination means determines that the transmission counterpart has no color printing capability; and transmitting means for transmitting image data read by the read controlling means to the transmission counterpart.

In this case, the transmitting means has multi destination transmission control means so that either of color/monochromatic data may be selectively transmitted, depending on the receiving capability of the communication counterpart.

The mixed image data may be mixed image data of each page or mixed image data of a row unit in one page.

According the above-mentioned structure, the normal color transmission can be performed to the counterpart that is capable of color printing, and only the monochromatic portion of the original paper can be transmitted to the counterpart that is not capable of color printing. Therefore, according to the latter, the minimum amount of image data can be transmitted.

Moreover, the above-mentioned object can be attained by the color facsimile apparatus comprising designating means for designating either a color transmission or a monochromatic transmission; storing means for encoding image data obtained by reading an original paper by either a color encoding method or a monochromatic encoding method in accordance with the designation of the designating means; determination means for determining whether the image data obtained by reading the original paper is color image data or monochromatic data; and transmission controlling means for decoding the image data once encoded by the color encoding method and stored in the storing means so as to be encoded again by the monochromatic encoding method, thereafter being transmitted when the color transmission is designated by the designating means and the image data is determined to be monochromatic image data by the determination means.

In this case, the determination on whether image data is color data not may be performed by imparting an identifier to either data in advance.

After the image data encoding process for one page or the whole pages by encoding means is ended, the transmission controlling means may execute a decoding process of image data and a re-encoding process thereof.

According to the above-mentioned structure, when transmitting data is color data, the transmission process can be completed for the shortest period of time.

Also, the above-mentioned object can be attained by the color facsimile apparatus comprising determination means for determining a color printing capability of a communication counterpart in the course of the communication procedure; color selection means for extracting only the color component, having the highest composition ratio occupying in the entire image data, from RGB components obtained by reading a color original paper when the determination means determines that the printing capability of the communication counterpart is that only the color printing with a specific single color can be performed; and transmitting means for encoding color component data extracted by the color selection means so as to be sent.

According to the above-mentioned structure, the operator on the transmission side can perform the color transmission without being conscious of the capability of the receiver, and the operator on the receiving side can receive the color data though it is pseudo-color.

BEST MODE FOR CARRYING OUT THE INVENTION

The following will describe the embodiments of the color facsimile apparatus of the present invention with reference to the accompanying drawings.

Figure 1:
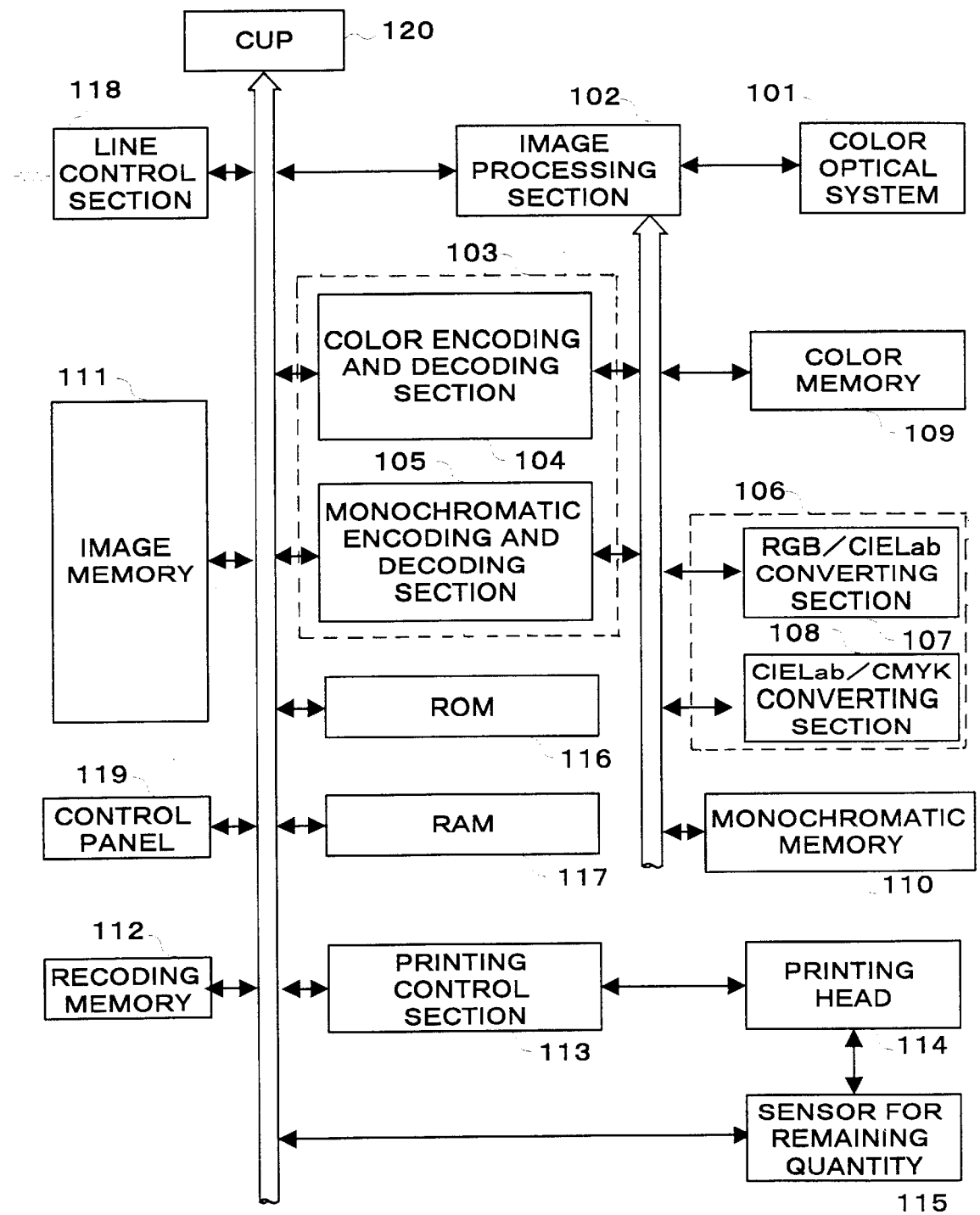
FIG. 1 is a block diagram of a color facsimile apparatus according to the present invention.

FIG. 1 is a block diagram showing the outline structure of the color facsimile apparatus of the present invention. The outline structure of the color facsimile apparatus can be explained as follows:

A color optical system 101 comprises a color reading section for color separating a color original paper into RGB components and a monochromatic reading section for reading the original paper with general binary data of black and white. Then, the color optical system 101 outputs data each A/D converted to an image processing section 102.

The image processing section 102 controls an encoding and decoding section 103 and a color converting section 106 (both described later), and executes various image processes. The encoding and decoding section 103 comprises a color encoding and decoding section 104 for executing the encoding and decoding of color data such as JPEG, etc. and a monochromatic encoding and decoding section 105 for encoding and decoding black and white binary data such as MR, MMR, etc.

The color converting section 106 is means for converting a color space between a reading system and a printing system. The color converting section 106 comprises a RGB/CIELab converting section 107 for executing a mutual color space conversion between the GRB components and CIELab and a CIELab/MCYK converting section 108 for executing a mutual color space conversion between CIELab and CMYK components. Further, the CIELab/MCYK converting section 108 executes a process in which all CMY signal components obtained by converting a specific color component are synthesized to be converted to a K component (to be described later) in addition to the normal data conversion between CIELab and the CMYK components. It is noted that CIELab is one of the standard color spaces expressed by lightness and chromaticity, which is defined by CIE (Commission Internationale de l' Eclairage (International Commission on Illumination)).

A color memory 109 and a monochromatic memory 110 are used as a work memory when data is operated by the encoding and decoding section 103 and the color converting section 106.

A image memory 111 is one that stores read data or received data in a data encoding state, and color data is encoded by JPEG, etc. in the color encoding and decoding section 104, and monochromatic data is encoded by MMR, etc. in the monochromatic encoding and decoding section 105. A printing memory 112 is one that stores printing data in a state in which encoded data is decoded. In a printing control section 113, a printing head 114 prints data stored in the printing memory 112. The printing head 114 is formed of, for example, printing heads for four colors CMYK like an ink jet printing head, and a remaining quantity of printing material of each head is monitored by a sensor 115 for a remaining quantity.

A ROM 116 stores control programs of various operations corresponding to the flow chart to be described later. A RAM 117 is a work memory. A line control section 118 for data receiving and transmitting from/to an outer terminal and a control panel 119 for designating various operations are provided. Then, a CPU 120 controls the entire apparatus.

The following will specifically explain each operation of the above-structured color facsimile apparatus with reference to the flow charts.

First Embodiment

Figure 2:
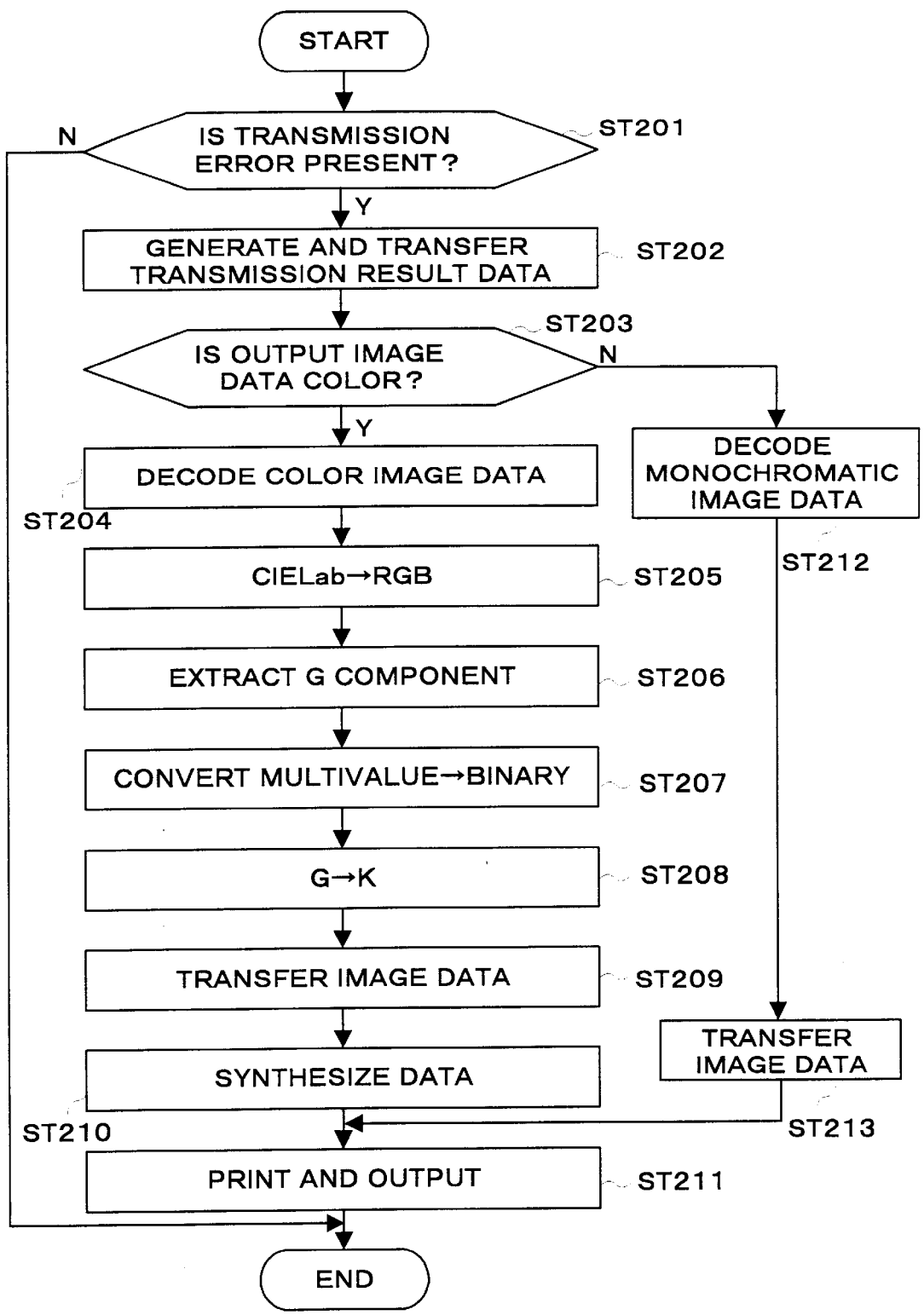
FIG. 2 is a flow chart showing the generation procedure of a communication result report of the color facsimile apparatus of a first embodiment of the present invention.

The color facsimile apparatus of the present invention outputs a communication result report of a case in which the transmission of the color original paper is not performed. The output operation will be explained along the flow chart shown by FIG. 2.

The communication result report is generated by a communication management section (not shown) every time when the receiving and transmitting are performed, and printed in a part of the image memory 111 in a code form. If the transmission procedure is not normally performed, it is determined that a transmission error is generated (ST201). Then, transmission result data including a transmission result, a transmission NO, a destination address ID, transmission start time, and a transmission mode is transferred to the RAM 117 from the image memory 111 (ST202).

Next, it is determined whether or not image data corresponding to the communication is color data (ST203) The determination is performed by the known method in which a vector value of CIELab coordinate data of the image data is determined.

If the image data of the communication error is color, image data stored in the image memory 111 is decoded by the color encoding and decoding section 104 under the control of the image process section 102 (ST204). The decoded data is once decoded to the color memory 109, and then converted to RGB data by the RGB/CIELab converting section 107 (ST205). Further, among the RGB data, R and B components are set as zero outputs, and only data of G component is extracted therefrom (ST206). Binary conversion of multivalued G component data is performed at a predetermined slice level (ST207), the binary data is converted to K (black) data by the image process section 102 (ST208), and temporarily stored in the monochromatic memory 110. Only the G component having the highest density can be extracted as component data from color data by the conversion process.

Further, the K component data is transferred to the RAM 117 (ST209), and synthesized with the previous transmission result data so that the transmission result report is generated (ST210). The synthesized data is transferred to the printing memory 112 and read out sequentially, and printed by the printing head for black 114 under the control the printing control section 113.

On the other hand, If the image data of the communication error is color, under the control of the image process section 102, image data stored in the image memory 111 is decoded by the monochromatic encoding and decoding section 105 (ST212), and transferred to the printing memory 112 (ST213). Thereafter, transferred data is read out sequentially, and printed by the printing head for black 114 in the printing control section 113 (ST211).

According to the above-mentioned structure, if the transmission of color image data is not normally ended, the communication result report is converted to monochromatic data to be output. As a result, the amount of color printing material consumed can be reduced. This results in a large effect on particularly the reduction of the quantity of the ink consumption in the apparatus using color ink for printing. Moreover, since the output is performed with monochromatic data, data can be printed and output for a short period time as compared with the case of outputting color data. Therefore, time when the communication result report output process occupies a printing section can be reduced to the maximum, and this contributes an efficient use of the apparatus.

According to the first embodiment, only extraction of the G component from color image data and the conversion of the G component to the K component resulted in obtaining monochromatic data. Thereby, profile data of the original data can be obtained with the simple structure without providing the special image process. Also, since data of all RRB is not reproduced, an output processing speed can be improved. The image of the transmission result report obtained in this way is, of course, different from the original image data. However, since a person, who confirms the transmission result report, is a possessor of the original paper, the person does not have trouble in confirming the identity of both the original data and the transmission result report.

In the first embodiment, the G component data was extracted. However, the color allocation thereof is different from that of the original paper. Therefore, if the RGB components are compared with each other and the color component whose composition ratio is in a fixed range is suitably selected, the transmission result report having a suitable profile data can be always obtained.

Further, in the first embodiment, the black was used in printing the communication result report. The ink to be used is not always the specific color. To avoid the situation in which the ink of the specific color is used up quickly, there may be modifications such as a selective use of ink which is consumed most so as to constantly keep the balance of the ink consumption of the entire ink cartridge.

Second Embodiment

Figure 3:
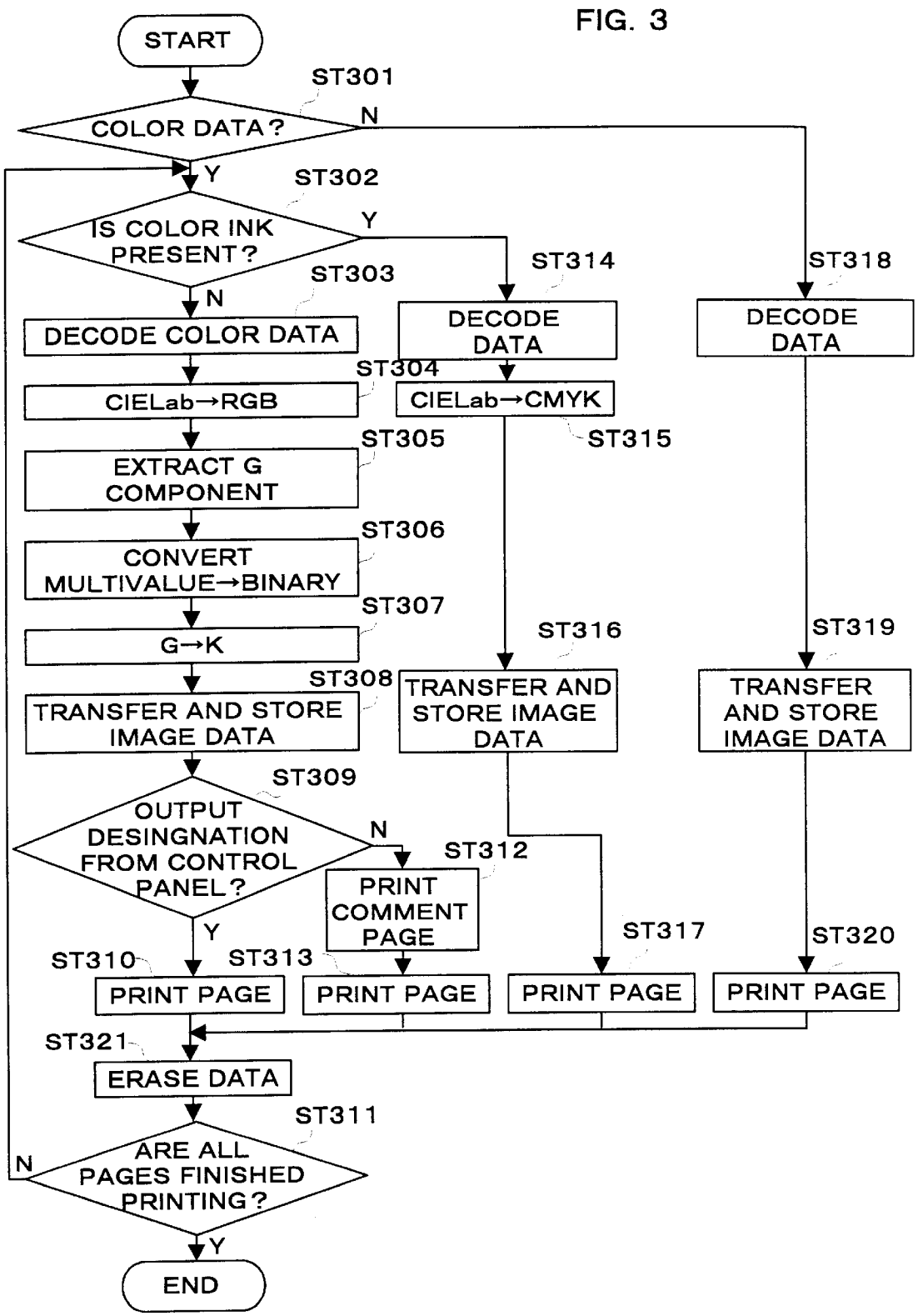
FIG. 3 is a flow chart showing a printing and outputting operation of receiving data when the absence of color printing material occurs according to a color facsimile apparatus of a second embodiment of the present invention.

The color facsimile of the present invention adds a comment and performs the printing when the absence of the printing material such as color ink occurs. The printing output operation of the received data will be explained along the flow chart of FIG. 3.

First of all, if there is a printing output designation, it is determined whether output data is color or monochromatic (ST301). Similar to the explanation of the first embodiment, the determination is performed based on CIELab coordinate data of the image data.

If printing output data is color, it is checked whether or not color printing material (color ink in this case) is present (ST302). If the absence of color ink occurs, printing data is read from the image memory 111, decoded by the color coding and decoding section 104, and once decoded to the color memory 109 (ST303). Then, the RGB/CIELab converting section 107 converts the decoded data to RGB data (ST304). Further, only G component data is extracted from the RGB data (ST305). Binary conversion of multivalued G component data is performed at a predetermined slice level (ST306). Thereafter, the binary data is converted to K (black) data by the image process section 102 (ST307), and temporarily stored in the monochromatic memory 110, and then transferred to the printing memory 112 (ST308).

Next, it is determined whether a printing output job being executed is an operation by an output designation from the control panel 119 due to the operator's intention or an automatic output for preventing the overflow of the image memory 111 (ST309).

If the printing output job being executed is the operation by the output designation from the control panel 119, page data is read from the printing memory 112 sequentially, and printed by the printing head for black 114 under the control of the printing control section 113 (ST310/ST311).

Conversely, if the printing output job is the automatic output for preventing the overflow of the image memory 111, printing is performed for a comment page (ST312). Then, page data is read from the printing memory 112 sequentially, and printed by the black printing head for black 114 under the control of the printing control section 113 (ST313/ST313). On the comment page, a message showing "printing and outputting data is data received as color image data" is displayed. The comment is stored in the ROM 116, and synthesized with received data to be output by the printing memory 112 prior to the printing and output.

On the other hand, if color ink is present (ST302), color printing is normally executed. In other words, color data is once decoded by the color encoding and decoding section 104 to be decoded to the color memory 109 (ST314) Then, the decoded data is converted to MYK data by the CIELab/CMYK converting section 108 (ST315), and transferred to the printing memory 112 (ST316). Thereafter, page data is read sequentially, and printed by the printing head 114 for color CMYK under the control of the printing control section 113 (ST317).

If printing output data is not color, data, which is read from the image memory 111 and decoded by the monochromatic encoding and decoding section 105, is transferred to the printing memory 112. The printing head 114 for black K prints the transferred data under the control of the printing control section 113 (ST320).

In any case, every time when page printing is ended (ST310/ST313/ST317/ST320), the page data is erased from the image memory 111. Thereby, the remaining capacity of the image memory 11 is increased in a page output unit.

As mentioned above, according to the second embodiment, even if any one of printing material is used up, the printing and output can be performed without losing received data. Similar to the first embodiment, since only the G component can be extracted from color image data so as to output profile data, the profile data of the original image data can be obtained with the simple structure. The significance of the facsimile for receiving and transmitting data from/to the remote site lies in the point that data can be transmitted by outputting even if data is complete data such as profile data.

Further, when the normal CMYK conversion of image data is performed by the CIELab/CMYK converting section 108 and synthesized with each other, and printed and outputted with black ink, the density level of the entire image is increased. As a result, in many cases, the entire image may be block.

However, one of the RGB components is selectively extracted, appropriate profile data can be obtained. Similar to the first embodiment, the color component to be extracted is not limited to the G component.

Since the output image obtained in this way is different from the original image data, a comment showing conversion data to monochromatic data is added. In the second embodiment, the comment is output only in the case of the automatic output for preventing the overflow of the image memory 111. The comment is not output in the case of the output designation from the control panel 119. The reason is as follows:

Specifically, in the case of the output designation from the control panel 119, the operator knows the presence of received data stored in the image memory 111 due to the absence of ink and designates the output, there is no need of adding the comment.

Also, in the second embodiment, the comment was output on the front page. The color data was output on another page so that the image was output as it was since the image was drawn on the entire page. It is of course possible that the same comment data can be synthesized with the top portions of all pages or the rear end portions to be output.

Though the comment may be printed with black ink, the use of color ink, which has the lowest amount of consumption, can keep the balance of the ink consumption of the entire ink cartridge, including the black ink, constantly.

Third Embodiment

Figure 4:
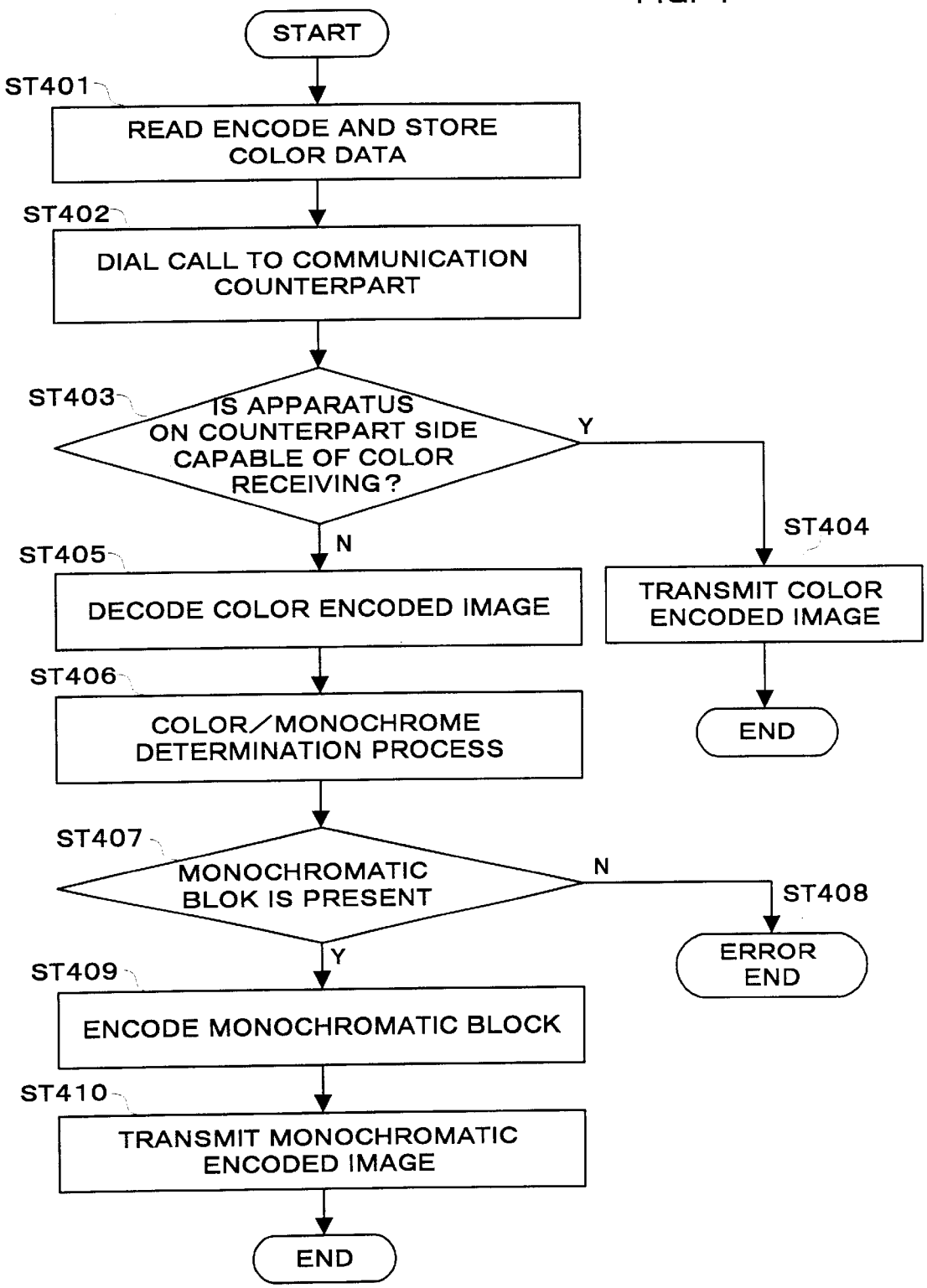
FIG. 4 is a flow chart showing a transmitting operation when the transmission is performed from a color facsimile apparatus of a third embodiment of the present invention to the other facsimile apparatus.

The color facsimile apparatus of the present invention can transmit a part of data in performing the transmission to the counterpart having no color printing capability. This transmitting operation will be explained along the flow chart shown in FIG. 4.

First, in performing the transmission of the color original paper, color data read by the optical system 101 including a color scanner is encoded by the color encoding and decoding section 104 under the control of the image processing section 102. Then, the encoded data is stored in the image memory 111, regardless of whether or not the color facsimile apparatus on the counterpart side has the color printing capability (ST401).

Next, a call is given to the communication counterpart (ST402), and it is checked whether or not the apparatus on the counterpart side is capable of color receiving on the communication procedure (ST403). If the apparatus is capable of color receiving, encoded color image data stored in the image memory 111 is sequentially transmitted (ST404). If the apparatus is not capable of color receiving, color image on the image memory 111 is read for each predetermined block, and once decoded to raw data by the color encoding and decoding section 104 so as to be decoded to the RAM 117 (ST405) Next, it is determined whether each block is data including a color image or data having only a monochromatic image (ST406) This determination process is performed in the same way as the first and second embodiments. However, since color image data is stored in the image memory 111 in the CIELab data form, the image processing section 102 may perform the color/monochrome determination at the data restoring time.

If all blocks are ones that have no monochromatic data (a case in which color image data is included in all blocks), the communication is error ended (ST407/ST408). Since the apparatus on the counterpart side has no data which can printed and output even if the receiving is performed, the error ending is executed. Though read color image data can be, of course, converted to monochromatic data to be transmitted, the error ending is executed in the third embodiment.

If the monochromatic block having only monochromatic image data is present in transmitting image data in ST407, the block is encoded again by the monochromatic encoding and decoding section 105 (ST409), and transmitted from the line control section 118 (ST410).

Thus, there may be a case in which the transmission of the character portion has the significance itself even if the color image data portion of the original paper such as a photograph is not transmitted. In this case, the normal color transmission is performed to the counterpart having the apparatus, which is capable of color printing. Then, only the monochromatic portion of the original paper is transmitted to the counterpart having the apparatus, which is not capable of color printing. As a result, the minimum image data can be transmitted. Since data deleting image data of the color portion is transmitted, the operator on the transmitting side does not have to prepare an original paper in which only monochromatic image data portion is edited.

The determination process in ST406 can be performed in a line unit. In this case, only the monochromatic data of transmission data of one page can be transmitted. Also, the determination process can be performed in a page unit. In this case, it is determined whether or not the transmission is performed in the page unit. If the unit when the determination is performed is structured to be suitably changeable, the operator can select the unit, depending on the circumstances of the distribution of color data in the transmitted data, so that the operability of the apparatus can be improved.

Fourth Embodiment

Figure 5:
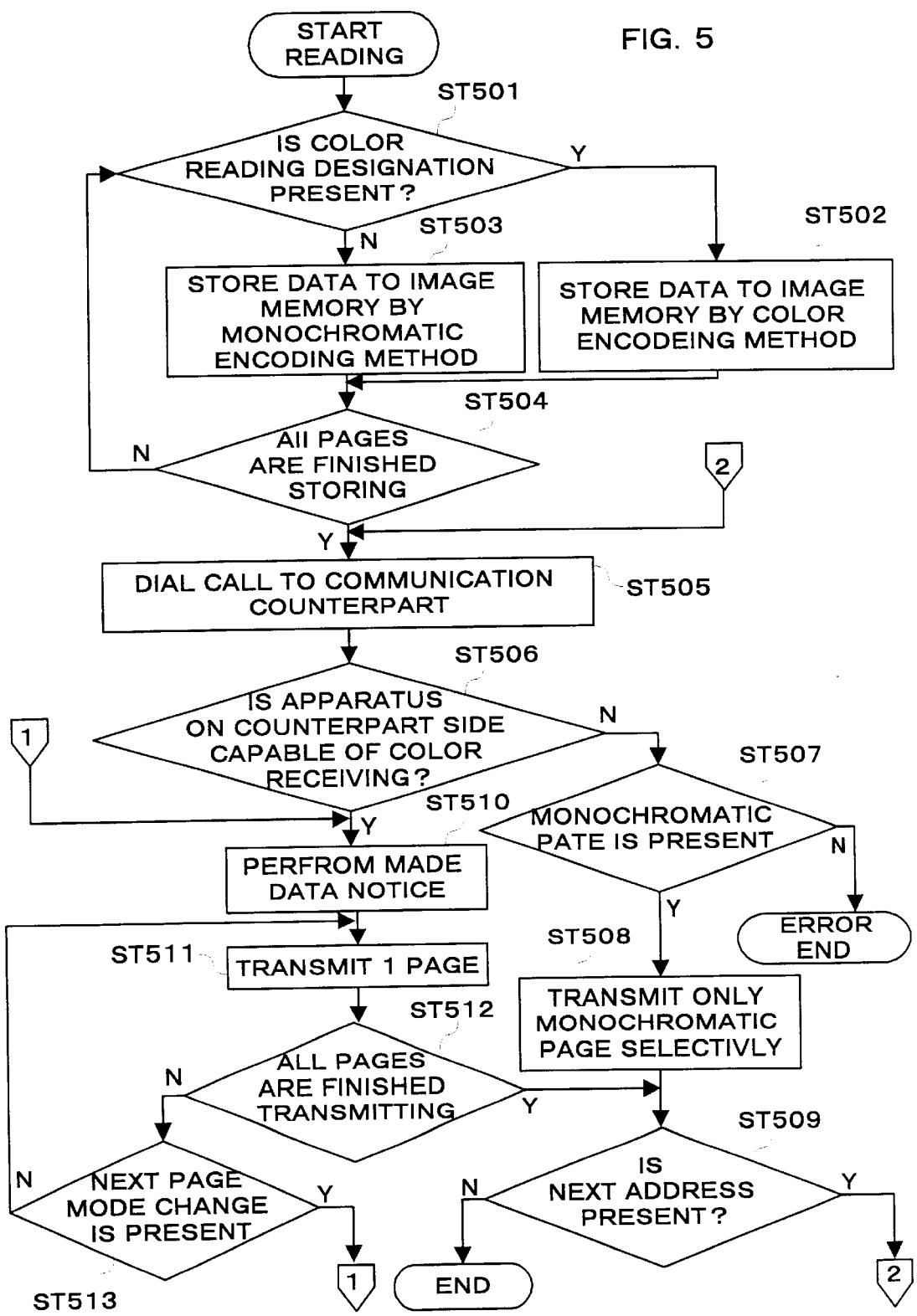
FIG. 5 is a flow chart showing an operation when an original paper in which color/monochromatic image data is mixed is multi destination transmitted according to a color facsimile apparatus of a fourth embodiment of the present invention.

The color facsimile apparatus of the present invention can multi destination transmission to sent the original paper in which color/monochrome data is mixed to a plurality of facsimile apparatus including the facsimile apparatus having no color receiving capability. The transmitting operation will be explained along the flow chart shown in FIG. 5. The fourth embodiment is different from the third embodiment in the points that whether or not the transmission is needed is determined in the page unit and that the multi destination transmission is performed to a plurality of addresses.

First, the CPU 120 checks whether or not there is a color reading designation from the control panel 119 (ST501). When there is the color reading designation, the color optical system 101 reads the color reading designation, the color encoding decoding section 104 JPIG encodes read data, and stores in the image memory 111 (ST502). When there is no color reading designation, the monochromatic encoding decoding section 105 MR encodes read data, and stores in the image memory 111 (ST502). This process is repeated until the encoding and storing of all pages are ended (ST504).

Next, a call is given to a first communication counterpart (ST505). Thereafter, it is checked whether or not the apparatus on the counterpart side is capable of color receiving on the communication procedure (ST506).

If the apparatus on the counterpart side is not capable of color receiving, it is checked whether or not there is a monochromatic page in the transmitted data by the dame method as the third embodiment (ST507). If there is no monochromatic page therein, the error end is executed since the apparatus on the counterpart side has no data that can be received. If there is the monochromatic page therein, the page is selectively transmitted similar to the third embodiment (ST508). Next, if there is the other address to be multi destination transmitted, the process in ST509, the call process in ST505, and later processes are repeatedly executed.

If the apparatus on the counterpart side is capable of color receiving, a mode data notice for transmitting color data to the apparatus on the counterpart side is executed (ST510). Thereafter, encoded data, which is color encoded, for one page is sequentially read from the image memory 4 and transmitted (ST511). After the end of the data transmission for one page, it is checked whether or not the transmission of all pages are ended (ST512).

If there is a next page, it is checked whether the next page is color data or monochromatic data (ST513).

If the next page is color data, the transmission mode is unchanged and the next page is transmitted. If the next page is monochromatic data, it is regarded that the transmission mode has been changed, a mode data notice for transmitting black and white binary data is executed (ST510). Thereafter, the next page is transmitted. After the end of the transmission of all pages, if there is the other address to be multi destination transmitted (ST509), the call process (ST505) and later processes are repeated.

Thus, all image data is transmitted to the facsimile apparatus having the color receiving capability. On the other hand, the monochromatic image data portion is transmitted to the facsimile apparatus having no color receiving capability. As a result, the operator can execute the multi destination transmission without consciousness of the capability of the apparatus on the counterpart side.

It is assumed that the kind of the apparatus, which is capable of color receiving and the kind of the apparatus, which is not capable of color receiving, are mixed as a multi destination transmission address. Even in such a case, the transmission method for transmitting all image data and the transmission method for transmitting only the monochromatic portion can be suitably switched, depending on the receiving capability of the apparatus on the counterpart. Thereby, the multi destination transmission can be efficiently executed, and time required for the entire multi destination transmission can be reduced.

Fifth Embodiment

Figure 6:
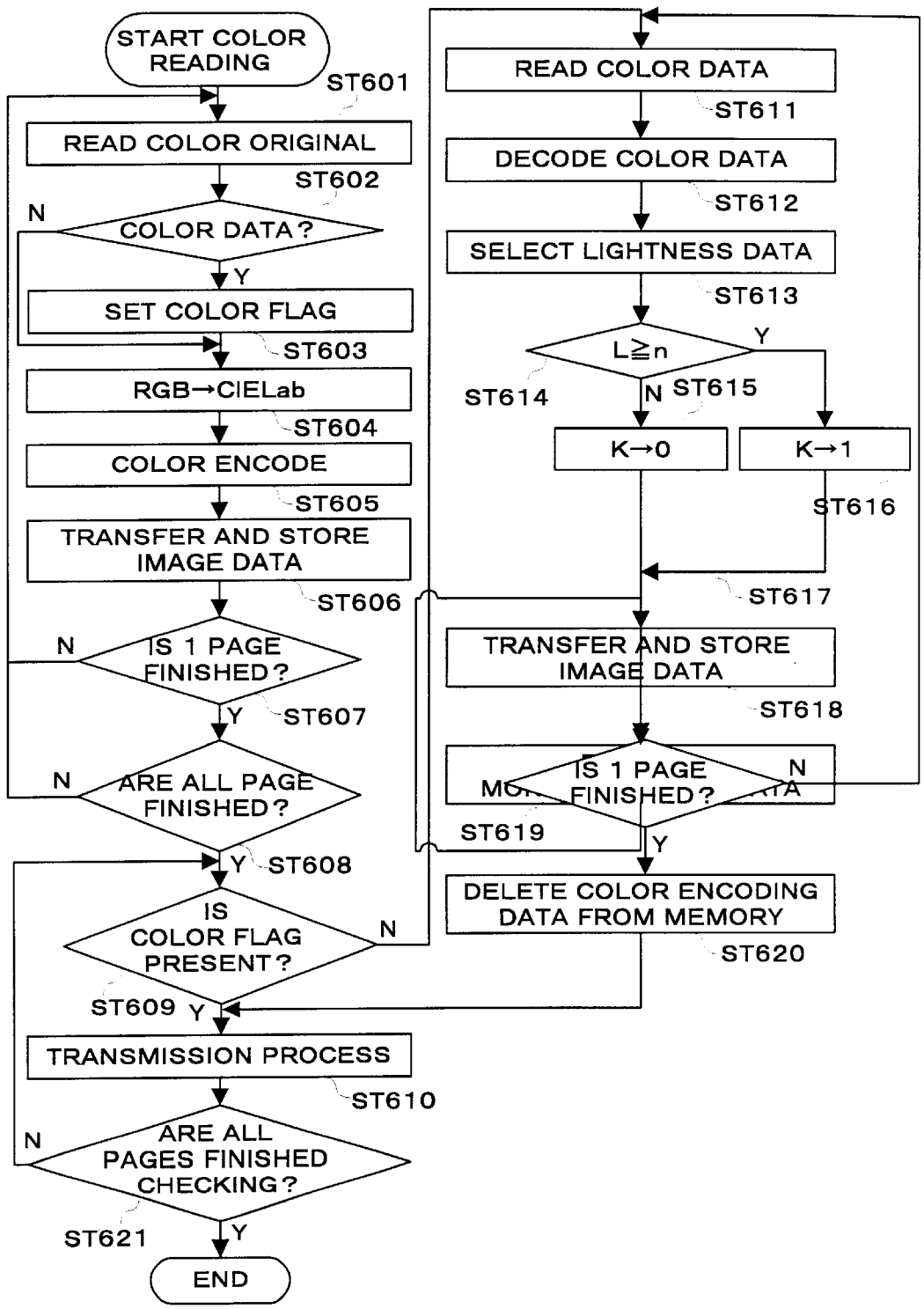
FIG. 6 is a flow chart showing a transmitting operation of color image data or monochromatic image data according to a fifth embodiment of the present invention.

The color facsimile apparatus of the present invention can rapidly transmit the original paper of either one of color image data and monochromatic data. The operation will be explained along the flow chart shown in FIG. 6.

First, the color optical system 101 separates the color original paper into the RGB components to be read (ST601). The image processing section 102 determines whether read data is color data or monochromatic data from the color component data (ST602). If data is color, a color flag, which shows that the page includes color data, is set at the head of the page of a read data row (ST603). The color/monochrome determination process and the flag setting may be performed at any timing. However, if they are performed just after reading the original paper, the efficiency of the performance is improved.

Next, read data is converted to CIELab data by the RGB/CIELab converting section 107, and encoded by the color encoding and decoding section 104 to be stored in the image memory 111 (ST605/ST606). These operations are repeated for each page until all pages are ended, and the image data storage is ended (ST607/ST608). Thus, all read data is once stored in the image memory 111 as color image.

Then, the processes in which data stored in the image memory 111 is read and transmitted are repeated. First, stored color image data is read in order of page, and the color flag, which is added to the head of each page, is checked (ST609). If the color flag is detected, the page data is directly incorporated into a transmission queue and transmitted from the line control section 118 (ST610).

If the color flag is not detected in step ST610, the page is data having only the monochromatic data image and the following conversion process is executed so that color multivalued data is converted to monochromatic binary data, thereafter the transmission process (ST610) is executed.

First, color encoded image data is read from the image memory 111, and decoded by the color encoding and decoding section 104 to be decoded to the color memory 109 (ST611) The image processing section 102 sequentially fetches lightness data "L" of CIELab data one bit by one to determine whether or not lightness data is a predetermined slice "n" or more, thereby determining whether the bit is black data or white data (ST613/ST614).

As a result of the determination, the bit of white data is set to "0" (K=0), and the bit of black data is set to "1" (K=1) (ST615/ST616). Then, data obtained by executing the multivalue/binary conversion process for one line is MR encoded by the monochromatic encoding and decoding section 105 (ST617), and transferred and stored to the image memory 111 (ST618).

If the lightness data "L" is the fixed value "n" or more, the bit is regarded as a block, and the slice level determination is suitably fixed with reference to a standard value of psychological measuring lightness.

In the above case, the color/monochrome conversion is performed by the level determination of lightness data "L".

However, there may be used the method in which G component data is converted to K (black) data after the RBG conversion of CIELab data.

The above-mentioned processes are repeated until one page is ended (ST619). At the time when one page is ended, color data for one page on the image memory 111 is deleted (ST620). Next, the transmission of the monochromatic data of the page is executed (ST610).

The above-mentioned processes are repeated until all pages are ended, so that the transmission operation is completed (ST621).

Thus, in the fifth embodiment, on the precondition that all original papers are color transmitted, data was color-read, color-encoded, and stored in the image memory. Thereafter, it was determined whether transmitting data was color or monochromatic. Therefore, if transmitting data is color, the transmission process can be completed for the shortest period time. Conversely, if transmitting data is monochromatic, the time that elapses before the transmission process of monochromatic data is completed is increased. However, since the process of monochromatic data is finished for a short period of time, it does not take much time to perform the process of monochromatic data in view of the entire communication time.

Whether or not the read page is color is easily determined using the RGB component data just after reading data. On the other hand, the conversion of color data to monochromatic data is precisely determined in the bit unit using CIELab data. As a result, both the speedup of the color data process and the maintenance of the reproducibility of monochromatic data can be realized.

Also, the color/monochrome is changed based on the detection result of the color flag, and transmission data is incorporated into the transmission queue in the page unit. As a result, if the transmission data is mixed data of color/monochrome, the transmission process and the color/monochromatic conversion process are executed in parallel, so that the efficiency of the process can be improved.

In the fifth embodiment, the color flag detection process was performed after color encoding and storage process for all pages was completed. However, this process can be performed for each page. In this case, the later page transmission process and the color/monochrome conversion process are executed at that time so as to improve the efficiency of the performance. Thereby, the transmission of the first page can be started for the shortest period of time.

Sixth Embodiment

Figure 7:
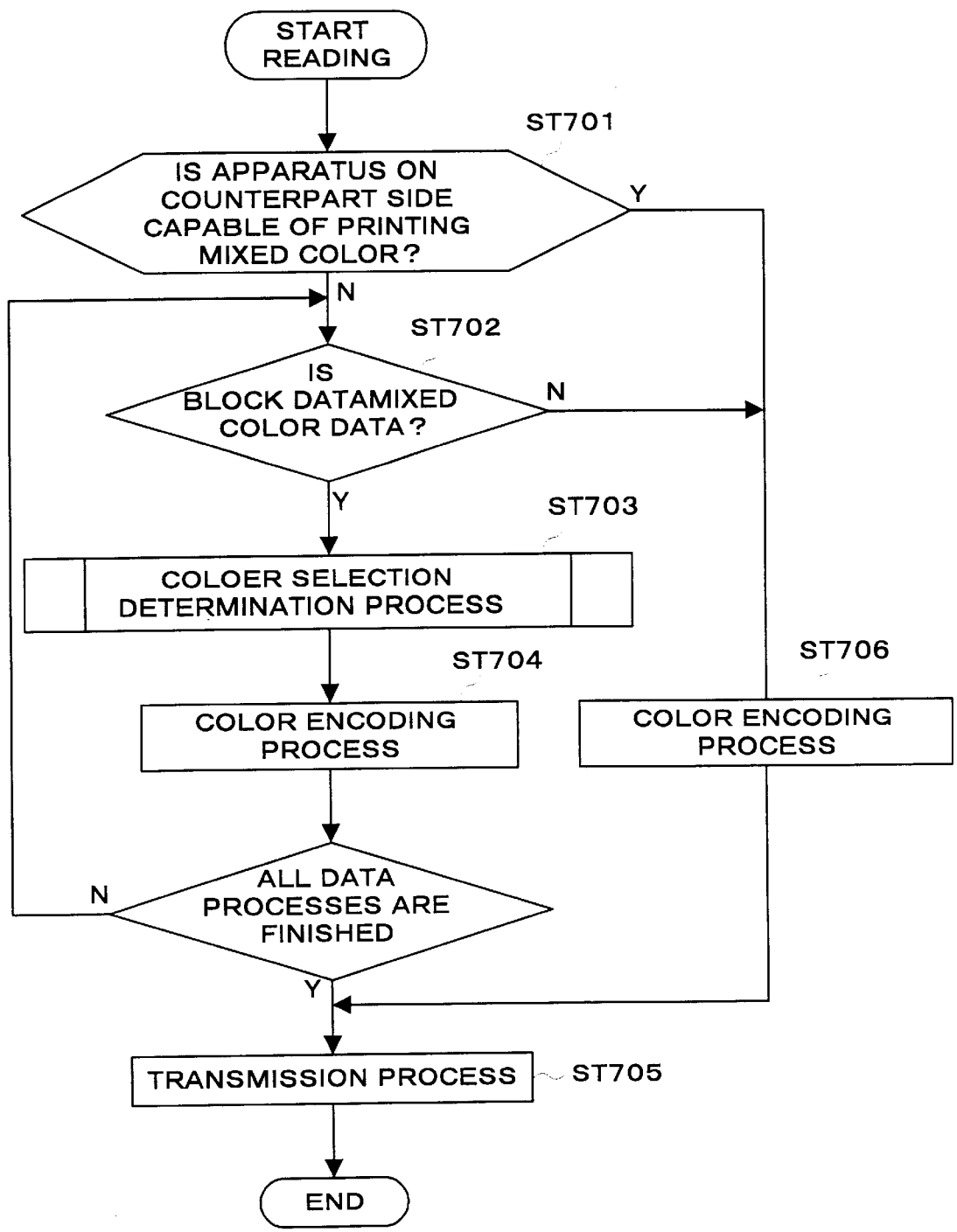
FIG. 7 is a flow chart showing a transmitting operation when the transmission is performed from a color facsimile apparatus of a sixth embodiment of the present invention to the other facsimile apparatus.

The color facsimile apparatus of the present invention can transmit color image data to the facsimile apparatus having the color receiving function whose capability is less than a fixed value. The transmission operation will be explained along the flow chart shown in FIG. 7. To simplify the explanation, the explanation of the process common to the above-mentioned processes will be omitted.

First, it is checked whether or not the apparatus on the counterpart side is capable of printing of mixed colors on the communication procedure (ST701). For example, there is the kind of apparatus, which can perform the printing of the single color of CMYK, and which cannot obtain an intermediate color generated by mixing these colors of CMYK and reducing them. In the case where the counterpart uses such a kind of apparatus, the image processing section 102 determines whether or not a target bit is mixed data (ST702). The determination is executed by determining the ratio of the respective components of read RGB data.

Next, a color selection determination process for determining the bit as any one of R, B, B is executed (ST703). This process replaces data with color data, which the apparatus on the counterpart side can print, and replaced data is encoded by the color encoding and decoding section 104 so as to be transmitted (ST704/ST705). If the apparatus on the counterpart side is capable of printing of mixed colors on the communication procedure (ST701), read color data is encoded by the color encoding and decoding section 104 so as to be transmitted (ST706/ST705).

Figure 8:
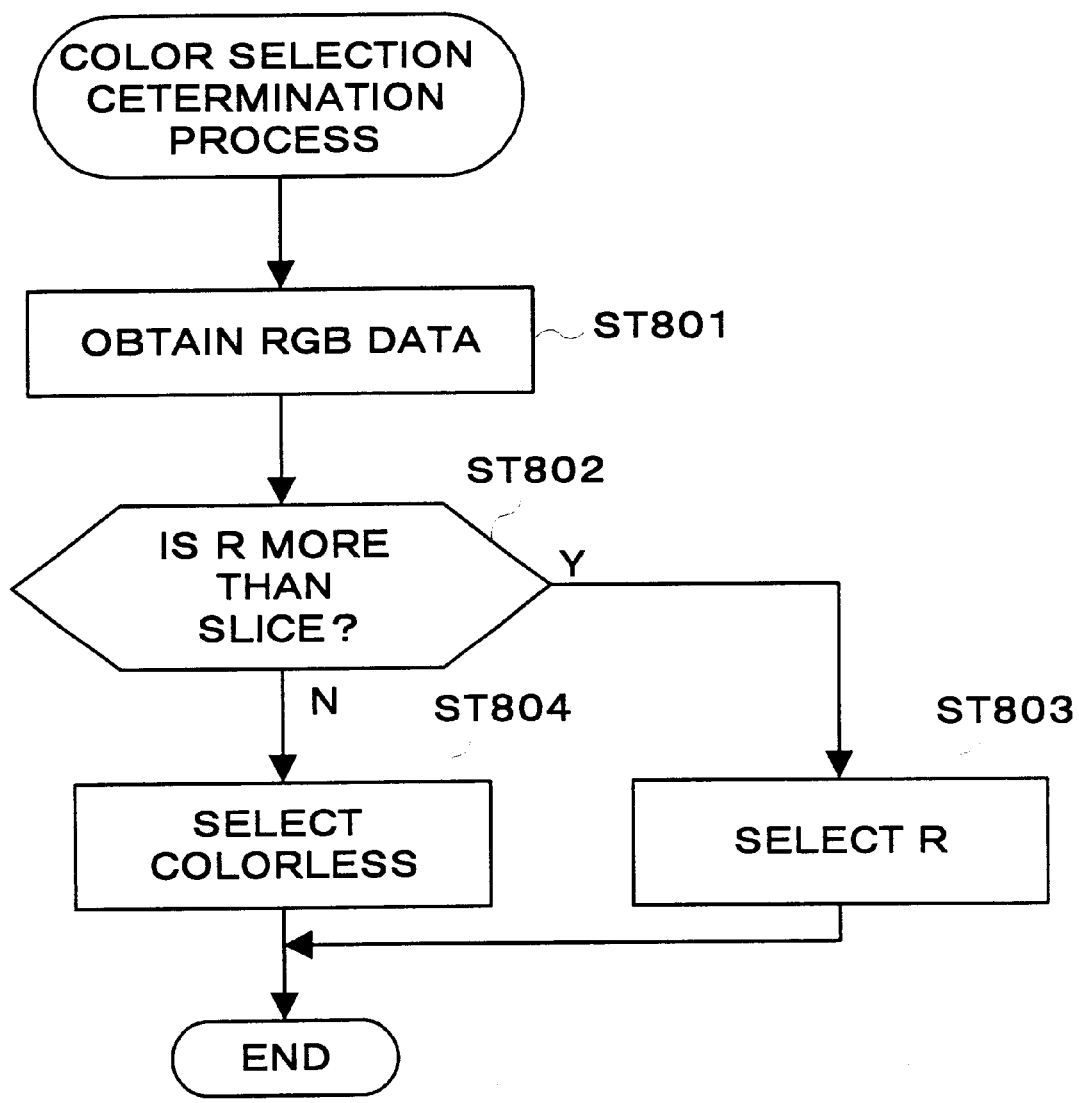
FIG. 8 is a flow chart showing a color selection determination process according to the sixth embodiment.
Figure 9:
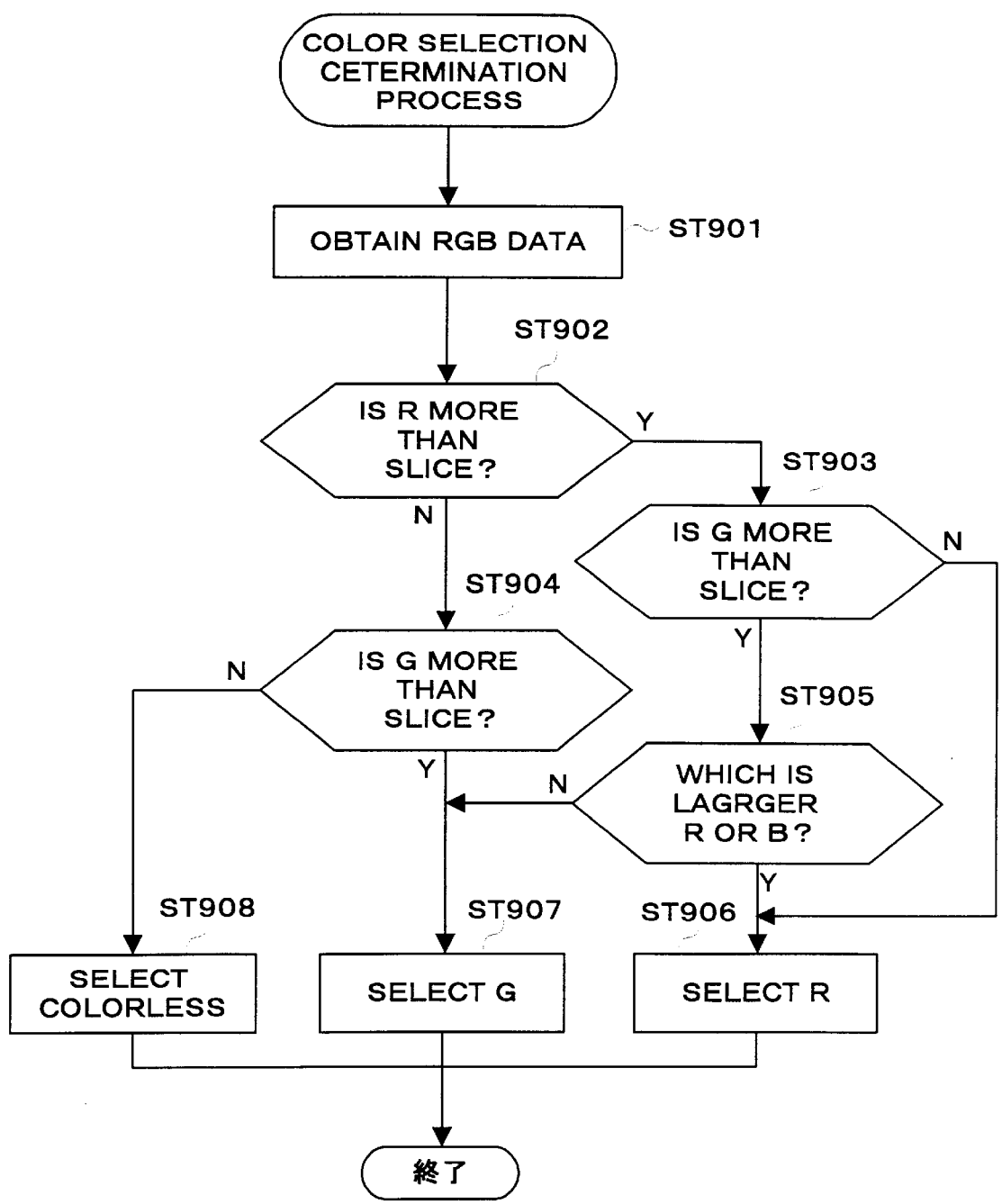
FIG. 9 is a flow chart showing a color selection determination process according to the sixth embodiment.

The color selection determination process in ST703 will be explained along FIGS. 8 and 9.

First, it is assumed that the receiver has the printing function of only the red. The image processing section 102 extracts R data of RGB data read by the color optical system 101 in the bit unit, and determines whether or not the R component is the fixed value or more (ST801/ST802) as shown in FIG. 8. If the R component is the fixed value or more, the pixel is regarded as R data "1." On the other hand, if the R component is below the fixed value, the pixel is regarded as no R data "0" (ST803/ST804).

It is assumed that the receiver has the printing function of two colors of red and green. The image processing section 102 extracts R and G data of RGB data read by the color optical system 101 in the bit unit, and determines whether or not each of R and G components is the fixed value or more as shown in FIG.9 (ST901/ST902/ST903/ST904). On the assumption that both components are the fixed value or more, either one of the color components having a larger value is regarded as a color of the pixel (ST905/ST906/ST907).

If both R and G components are below the fixed value, the pixel is regarded as no presence of data (white) (ST908).

The above processes are executed when the color receiving capability of the apparatus on the counterpart side becomes clear on the communication procedure. Therefore, the operator on the transmission side can perform the color transmission without being conscious of the capability of the receiver, and the operator on the receiving side can receive the color data though it is pseudo-color.

The present invention is not limited to the above-explained embodiments. Accordingly, various modifications may be made without departing from the spirit or scope of the general inventive concept as defined by the appended claims and their equivalents.

Industrial Applicability

As is obvious from the above explanation, the color facsimile apparatus of the present invention can be applied to the color facsimile apparatus for transmitting image data obtained by color reading the color original paper after being color encoding and for color printing received data.

What is claimed is:

1. A color facsimile apparatus comprising:
determination means for determining a color printing capability of a communication counterpart in the course of the communication procedure;
color selection means for extracting only the color component, having the highest composition ratio occupying in the entire image data, from RGB components obtained by reading a color original paper when the determination means determines that the printing capability of the communication counterpart is that only the color printing with a specific single color can be performed; and transmitting means for encoding color component data extracted by the color selection means so as to be sent.

2. A color facsimile apparatus having a printer which prints color image data, the color facsimile apparatus comprising:

a transmitter that transmits one of color image data and monochromatic image data to a destination;

a first detector that detects whether the image data was transmitted to the destination without error;

a generator that generates a transmission result report when said first detector detects that the image data was not transmitted to the destination without error, the transmission result report including at least a part of the image data that was to be transmitted;

a second detector that detects whether the image data that was not transmitted to the destination without error, is color image data;

said generator, when said second detector detects that the image data that was not transmitted to the destination without error, is color image data, converts the color image data into monochromatic data to generate the transmission result report; and a printer that prints the generated transmission result report, said printer printing the transmission result report in single color.

3. The color facsimile apparatus according to claim 2, wherein said generator selectively extracts one RGB component data of the color image data, converts the extracted single color component data, and generates the monochromatic image data to be included in the transmission result report based on the converted extracted single color component data.

4. The color facsimile apparatus according to claim 3, wherein said generator extracts G component data of the color image data.

5. The color facsimile apparatus according to claim 2, wherein said generator performs an extraction process after converting the image data stored as CIELab data to RGB data, converts the extracted single color component data to CIELab data again, converts the CIELab data to monochromatic image data, and generates image data to be included with the transmission result report based upon the monochromatic image data.

6. The color facsimile apparatus according to claim 2, wherein said printer comprises an ink jet printer.

7. The color facsimile apparatus according to claim 6, wherein said printer prints the transmission result report with black ink.

8. The color facsimile apparatus according to claim 2, wherein the transmission result report includes at least a destination address.

9. A color facsimile apparatus having a printer which prints color image data, the color facsimile apparatus comprising:

a transmitter that transmits one of color image data and monochromatic image data to a destination;

a generator that generates a transmission result report when the image data cannot be transmitted to the destination without error, the transmission result report including at least a part of the image data that was to be transmitted;

said generator, when the image data that cannot be transmitted to the destination without error, is color image data, converts at least part of the color image data into monochromatic data to generate the transmission result report in single color; and a printer that prints the generated transmission result report, said printer printing the transmission result report in the single color.

10. The color facsimile apparatus according to claim 9, wherein said generator converts the part of the color image data to be included in the transmission result report into monochromatic data.

11. A color facsimile apparatus having a printer which prints color image data, the color facsimile apparatus comprising:

a receiver that receives color image data from a sender;

a printer that prints the received color image data with a plurality of color materials;

a detector that detects an amount of each of the plurality of color materials of said printer;

a converter that converts the received color image data into monochromatic image data when said detector detects that the amount of any one of the plurality of color materials is beneath a predetermined level; and said printer printing the converted monochromatic image data with single color material, wherein said converter extracts single color component data after converting the image data as CIELab data to RGB data, converts the extracted single color component data to CIELab data again, and converts the CIELab data to monochromatic image data.

12. The color facsimile apparatus according to claim 11, further comprising a generator that generates an indication that received image data was color image data, when said converter converts the received color image data into the monochromatic image data.

13. The color facsimile apparatus according to claim 11, wherein said printer prints the information on a recording paper with the converted monochromatic image data.

14. A color printer comprising:

an acceptor that accepts color image data;

a printer that prints the accepted color image data with a plurality of color materials;

a detector that detects an amount of each of the plurality of color materials of said printer;

a converter that converts the accepted color image data into monochromatic image data when said detector detects that the amount of any one of the plurality of color materials is beneath a predetermined level; and said printer printing the converted monochromatic image data with single material, wherein said converter extracts single color component data after converting the image data as CIELab data to RGB data, converts the extracted single color component data to CIELab data again, and converts the CIELab data to monochromatic image data.

15. A method for printing a transmission result report, using a color facsimile apparatus having a printer which prints color image data, the method comprising:

transmitting one of color image data and monochromatic image data to a destination;

detecting whether the image data is transmitted to the destination without error;

generating the transmission result report when the detecting detects that the image data was not transmitted to the destination without error, the transmission result report including at least a part of the image data that was to be transmitted;

detecting whether the image data that was not transmitted to the destination without error, is color image data;

converting the color image data into monochromatic data to generate the transmission result report when the detecting detects that the image data that was not transmitted to the destination without error, is color image data, and printing the generated transmission result report in a single color.

16. The method according to claim 15, wherein the generating selectively extracts one RGB component data of the color image data, converts the extracted single color component data, and generates the monochromatic image data to be included in the transmission result report based upon the converted extracted single color component data.

17. The method according to claim 15, wherein the generating performs an extraction process after converting the image data stored as CIELab data to RGB data, converts the extracted single color component data to CIELab data again, converts the CIELab data to monochromatic image data, and generates image data to be included in the transmission result report based on the monochromatic image data.

18. A method for printing a transmission result report, using a color facsimile apparatus having a printer which prints color image data, the method comprising:

transmitting one of color image data and monochromatic image data to a destination;

generating a transmission result report when the image data cannot be transmitted to the destination without error, the transmission result report including at least a part of the image data that was to be transmitted;

converting at least part of the color image data into monochromatic data to generate the transmission result report in single color when the image data that cannot be transmitted to the destination without error, is color image data; and printing the generated transmission result report in the single color.

19. The method according to claim 18, wherein the converting converts the part of the color image data to be included in the transmission result report into monochromatic data.

20. A method for printing image data, using a color facsimile apparatus having a printer which prints color image data with a plurality of color materials, the method comprising:

receiving color image data from a sender;

detecting an amount of each of the plurality of color materials of the printer;

converting the received color image data into monochromatic image data when the detecting detects that the amount of any one of the plurality of color materials is beneath a predetermined level; and printing the converted monochromatic image data with single material, wherein the converting extracts single color component data after converting the image data as CIELab data to RGB data, converts the extracted single color component data to CIELab data again, and converts the CIELab data to monochromatic image data.

21. The method according to claim 20, further comprising generating an indication that received image data was color image data, when the converting converts the received color image data into the monochromatic image data.

22. The method according to claim 21, wherein the printing prints the information on a recording paper with the converted monochromatic image data.

23. A method for printing image data, using a color printer with a plurality of color materials, the method comprising:

accepting color image data;

detecting an amount of each of the plurality of color materials of the color printer;

converting the accepted color image data into monochromatic image data when the detecting detects that the amount of any one of the plurality of color materials is beneath a predetermined level; and printing the converted monochromatic image data with single material, wherein the converting extracts single color component data after converting the image data as CIELab data to RGB data, converts the extracted single color component data to CIELab data again, and converts the CIELab data to monochromatic image data.

* * * * *